United States Patent [19]

Dixon

[11] Patent Number: 5,791,855

[45] Date of Patent: Aug. 11, 1998

[54] LIFTING DEVICE

[76] Inventor: Michael Patrick Dixon, 1/104 Holmes Road, Moonee Ponds, Victoria 3039, Australia

[21] Appl. No.: 775,089

[22] Filed: Dec. 30, 1996

[51] Int. Cl.⁶ .................. B62B 1/06; B62B 1/14
[52] U.S. Cl. ................ 414/445; 414/450; 414/490
[58] Field of Search ............... 414/23, 444, 445, 414/448, 449, 450, 490, 622, 911; 294/86.4, 110.1

[56] References Cited

U.S. PATENT DOCUMENTS

| 355,238 | 12/1886 | Wing | 414/450 |
|---|---|---|---|
| 740,802 | 10/1903 | Brown | 414/445 |
| 978,344 | 12/1910 | Wirt | 414/450 |
| 993,008 | 5/1911 | West | 414/450 |
| 1,000,102 | 8/1911 | McCoy | 414/450 |
| 1,255,070 | 7/1918 | Waller | 414/450 |
| 2,123,669 | 7/1938 | Von Der Ohe | 414/445 |
| 2,197,587 | 4/1940 | Miller | 414/445 |
| 2,292,234 | 8/1942 | Malo | 414/445 |
| 2,584,918 | 2/1952 | Puig Salsas | 414/445 |
| 3,084,820 | 4/1963 | Malo | 414/450 |
| 4,741,659 | 5/1988 | Berg | 414/450 |
| 4,793,623 | 12/1988 | Talbot | 414/450 |

*Primary Examiner*—James W. Keenan
*Assistant Examiner*—Thuy V. Tran
*Attorney, Agent, or Firm*—Edwin D. Schindler

[57] ABSTRACT

This invention provides a mechanical device which can be easily positioned around an object to be moved, such that the object is securely held by the device and able to be easily moved to a new location. The invention is a lifting device which comprises an open chassis arrangement such that the object to be lifted can enter the device, and as it does so at least one moveable arm will engage and secure the object within the lifting device.

13 Claims, 4 Drawing Sheets

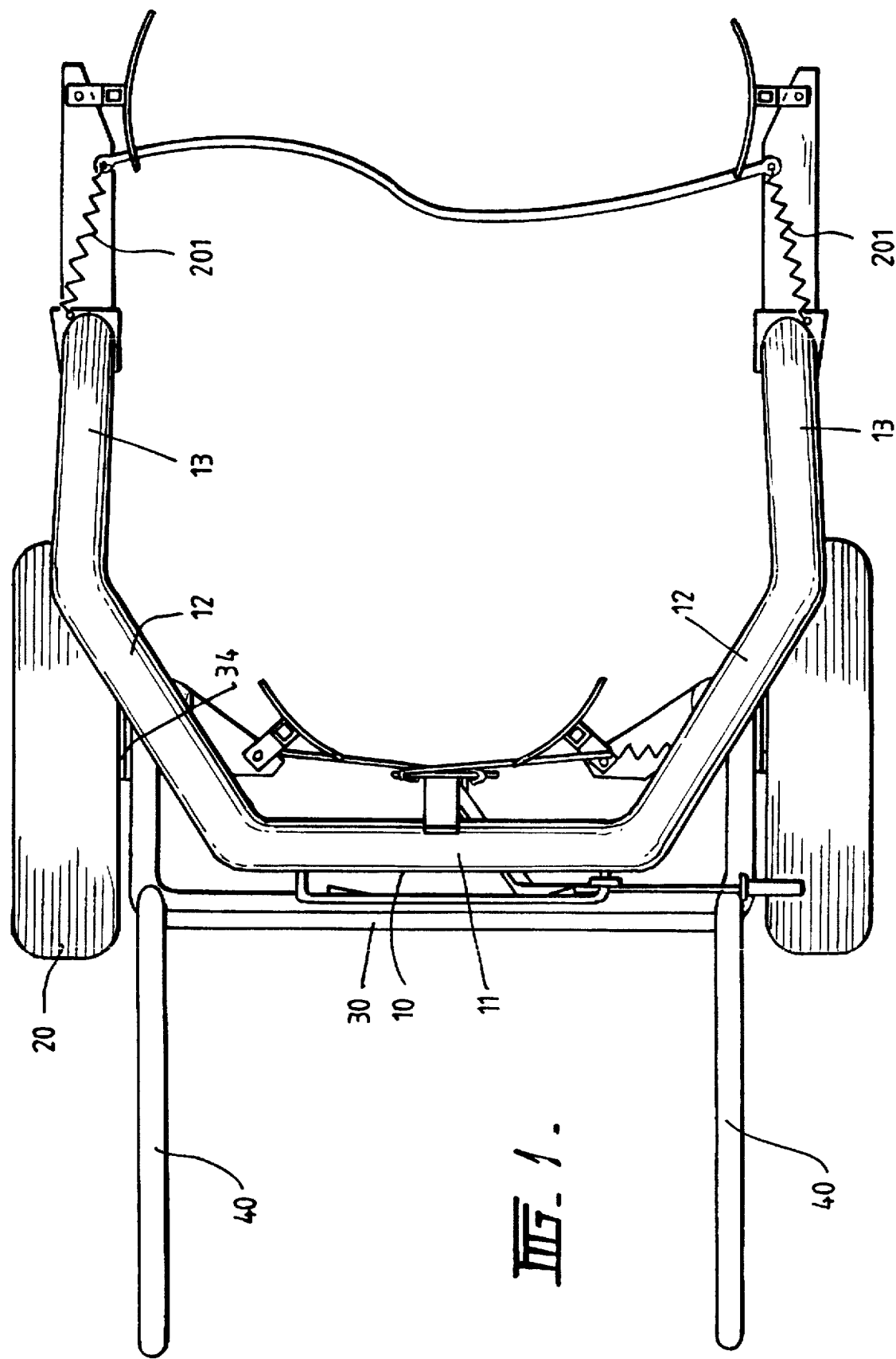

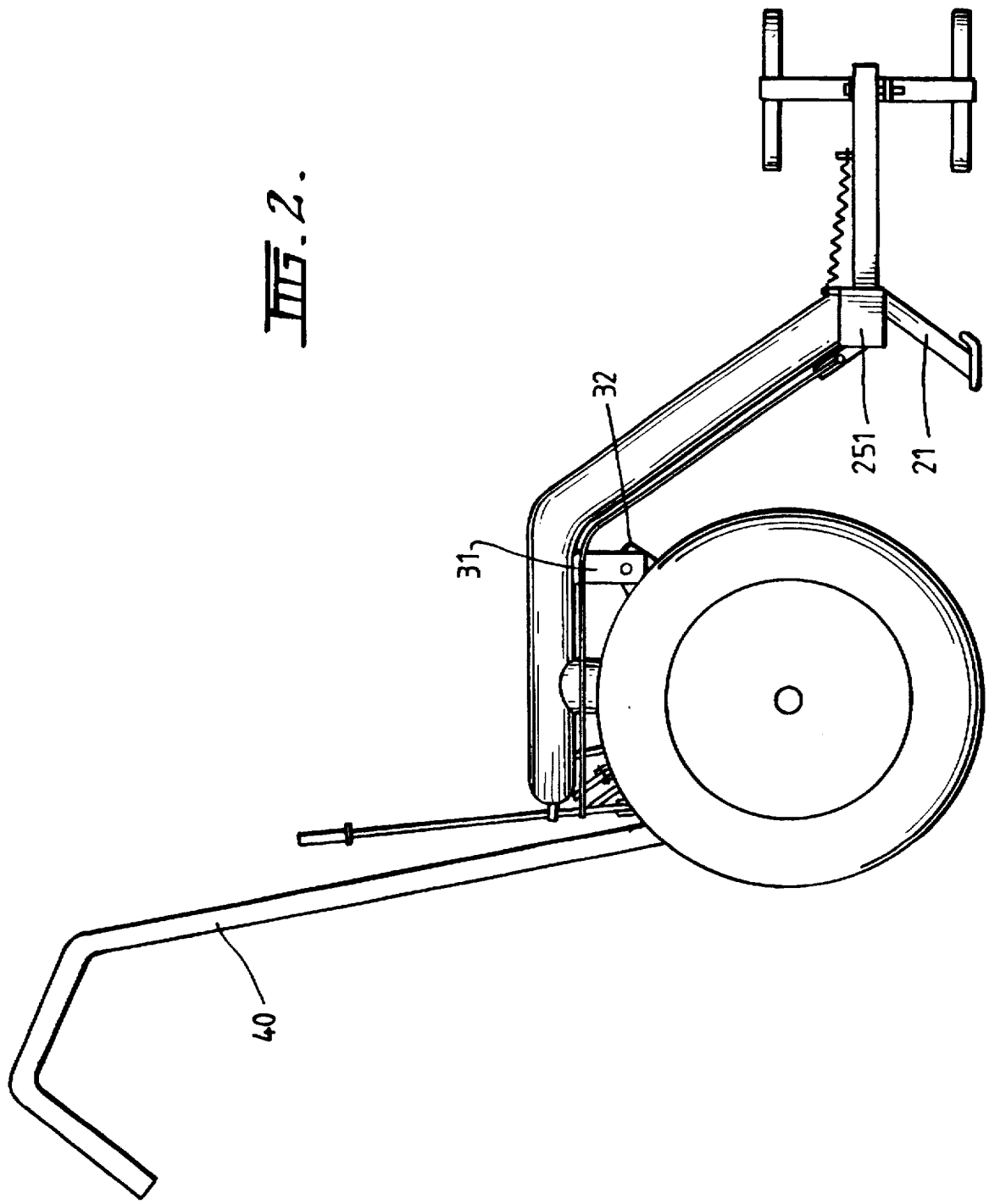

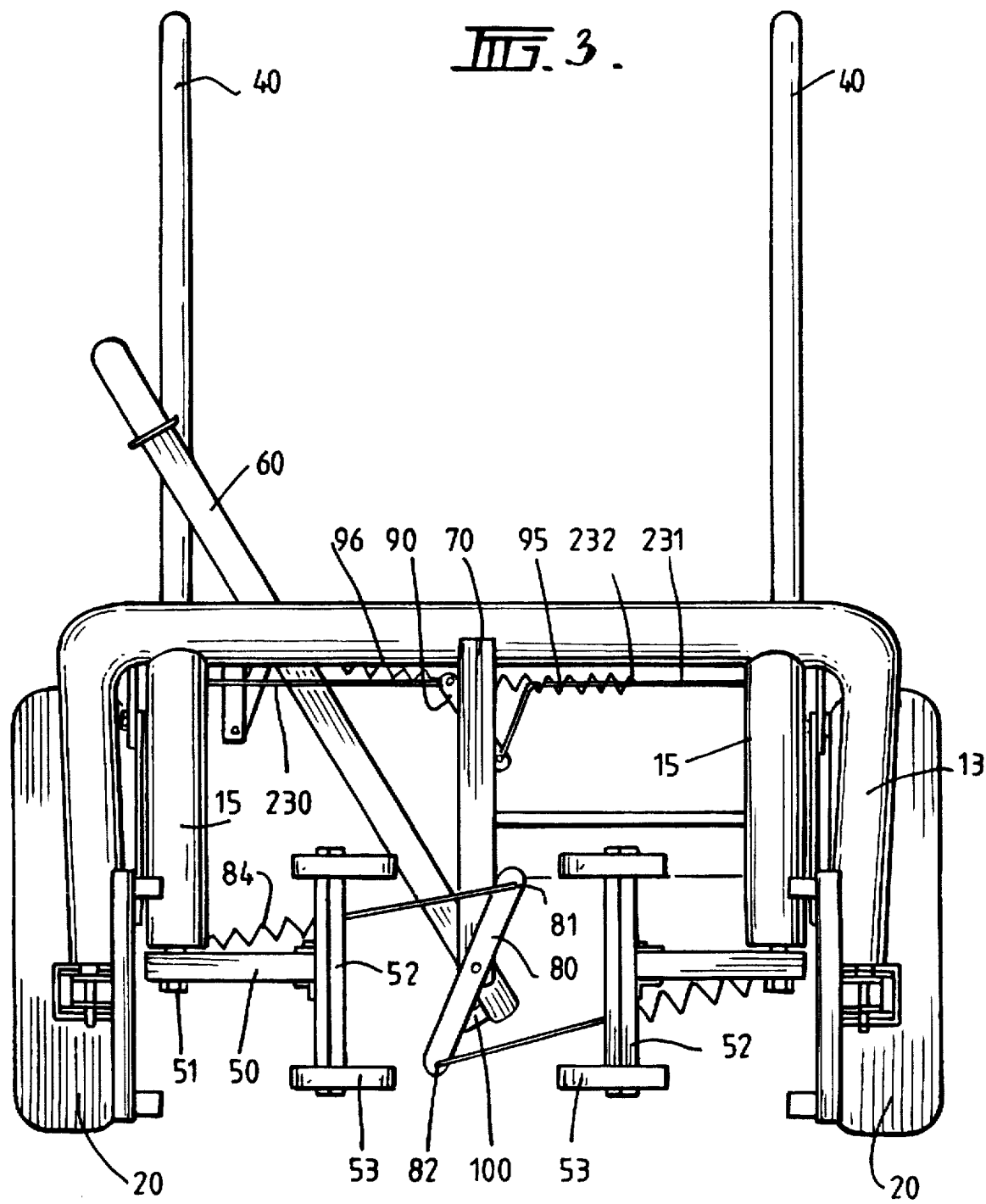

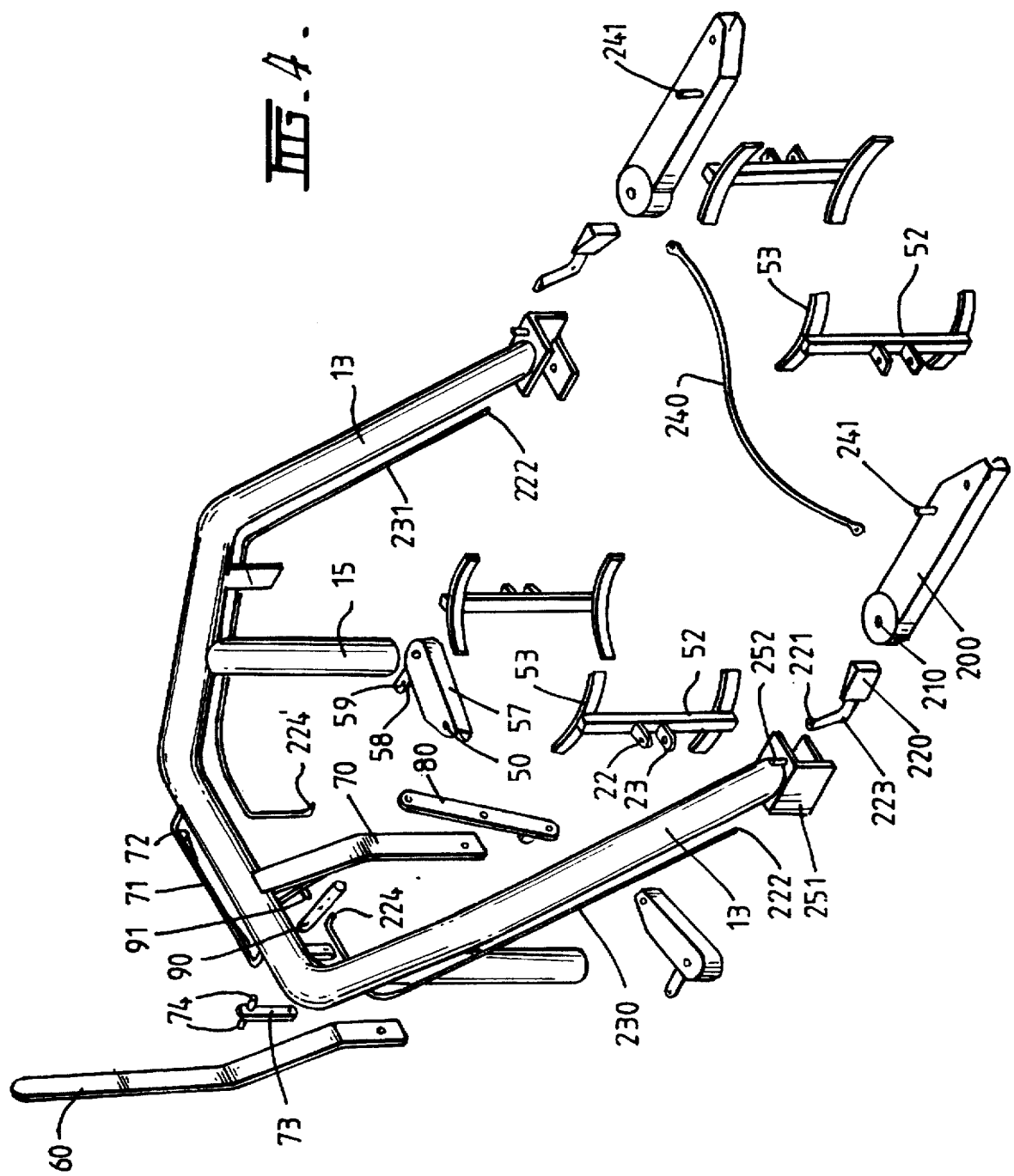

LIFTING DEVICE

This invention relates to a device to facilitate the lifting and transporting of heavy and cumbersome objects such as young trees and pot plants, which preferably obviates the need to touch the object, and which minimises the need to bend while handling the object.

It is a common practice in plant nurseries for quite large young trees to be moved by manual labour. Not only are trees and large shrubs extremely heavy but they are also quite cumbersome and awkward to move.

There is therefore a very real risk of injury to workers carrying out such tasks, and the consequences for employers with respect to occupational health and safety are profound.

These problems are not exclusive to the plant nursery industry as is evidenced by the high incidence of back injury among other workers such as plumbers who frequently have to manually haul heavy objects, such as water heaters etc., around in confined spaces.

This manual manipulation of awkward objects is also an everyday occurrence in almost all factories or industrial sites. There is consequently a need to provide a means of lifting and moving such objects in a way which will minimise the effort required by the person doing the lifting and/or moving and consequently minimise the occurrence of industrially induced injuries.

It is the object of this invention to provide a mechanical device which can be easily positioned around the object to be moved, such that the object is securely held by the device, the device then being able to be easily moved to the required new location for the object with minimal effort on the part of the user.

The invention, in its broadest sense, is a lifting device which comprises an open chassis arrangement such that the object to be lifted can enter the device, and as it does so at least one moveable arm will engage and secure the object within the lifting device.

Preferably the lifting device will be equipped with wheels, or some other form of locomotion, and with a handle or similar attached to enable movement of the device.

In order that the invention may be more readily understood a preferred embodiment thereof will be described in terms of the accompanying drawings.

FIG. 1 shows a plan view of the lifting device as viewed from above.

FIG. 2 is a schematic drawing of the lifting device as viewed from one side.

FIG. 3 is a schematic diagram of the rear assembly of the lifting device as viewed from the front FIG. 4 shows the main components of the invention pertinent to the lifting mechanism FIG. 1 shows a view from above of the basic chassis structure of the lifting device. A rear and side framework 10 has a straight rear portion 11 continuing on either side into diagonally outwards oriented sections 12 and then into downwardly forward oriented sections 13 to effectively form an arcuate shape.

The upper framework 10 is connected to a lower framework 30 through struts 31 and 32 (FIG. 2) terminating at the wheel base 34 where the handles 40 are attached. The exact mechanism whereby this chassis construction is achieved and the materials used is not germane to this invention except that there exists a framework 10 of the type described to which wheels, or some other form of locomotion, can be attached as well as handles, or a frame or some other means of propelling the lifting device. As can be seen in FIG. 2 the lifting device is fitted with support legs 21 attached to the bases of housings 251.

The upper framework 10 is affixed to two members 15 (FIG. 3) in the vertical plane which angle back from the centre of each side portion 12 of the framework to their bases, which are approximately at mid-wheel height, and to which are attached horizontal rear load grabbing arms 50.

The load grabbing arms 50 (FIG. 4) comprise two components 57,58 being the actual arm sections 57 which are attached to back support members (FIG. 4) for the object to be lifted and a section 58 at an angle of approximately 75 degrees to arm section 57. The back support members consist of uprights 52 with arcuate members 53 fitted at each end.

The back support members are attached to arm sections 57 by pins through holes 22,23 in lugs attached at the back of uprights 52 to allow the support members to move away from the vertical plane.

A member 70 in the vertical plane descends from the middle of the back upper framework section 11 and is connected near its base to pivoting member 80 and the load gripping lever 60. Movement of lever 60 against a stop 100 on the lower rear side of pivoting member 80 causes rotation of pivoting member 80.

As shown in FIG. 3 a spring/cable member 84 is connected between the upper end 81 of pivoting member 80, attached through member 70 to lever 60, to one of the members 58 at fixation point 59 thereon. A corresponding spring/cable member 83 connects between fixation point 82 on the lower end of pivoting member 80 and fixation point 59 on the other member 58. Movement of lever 60 acts then to move the load grips (FIG. 4) into position about the load.

The exact locking method used is not material to the invention nor is the requirement that the backing members be moveable. In fact it is envisaged that the front movable arm or arms may themselves provide sufficient force to hold an object securely in the lifting device.

The front arms 200 of the lifting device are attached to the side sections 13 of the upper framework in a housing 251 through a cam 210. A rubber guide 240 is connected at pins 241 to the front ends of the arms 200 such that when the lifting device approaches an object the rubber guide 240 will be pushed backwards and cause the front arms 200 to turn in towards the object and wrap the front support members connected to the front of arms 200 around it.

Also located in the housings 251 are wedges 220 each connected to a member 223 which connects at its outside extremity 221 with the lower end 222 of wedge control rods 230,231 which is tensioned by springs 95 in the locking direction.

The effect of rotation of the cammed arms 200 is to allow spring 95 to pull the wedges 220 further into the housings 251 such that the front arms 200 are locked in position by the wedges until the tension on the wedge control rods 230,231 is released.

Springs 201 provided between points 252 on housings 251 and points 241 on arms 200 pull the arms apart when the object lifted has been released.

The mechanism for manipulating the wedge control rods is shown in FIG. 3 and FIG. 4. A rotatable member 90 is connected near the top and at the rear of member 70 with pin 91 which is connected to member 73 which is fitted with pins 74 which can be acted on by lever 60. Wedge control rod 230, having paint 224, is connected to the upper end of member 90 as is a tensioning spring 96 connecting to pin 74. Wedge control rod 231 is connected to the lower end of member 90 and a further spring 95 connects between the upper rear end of member 70 and a point 224 on rod 231.

When the object lifted is to be released lever 60 contacts pin 74 of member 73 causing member 90 to rotate such that rods 230 and 231 push wedges 220 out of housings 251 thereby unlocking arms 200, otherwise spring 95 acts to draw the wedges 220 into housings 251. Lever 60 also locates the back support members by causing rotation of member 80. Lever 60 moves within an area confined by a member 71 attached to the back of the upper framework section 11. Protuberances 72 on the inner edge of member 71 at either end act as locking positions for lever 60.

The exact material which is used to construct the components of the lifting device is not germane to this invention. The preferred embodiment has been constructed from metal components in order to provide the strength required for a lifting device for essentially very heavy objects.

In the preferred embodiment the lifting device has two front arms 200 and two front support members for the object to be lifted and has two rear arms 57 with two rear support members. While this appears to be the most practical arrangement the invention is not constrained by the number of such members used.

The essence of the invention is that the lifting device be fitted with some flexible material in front of it which, when contacted by the object to be lifted, causes the object to be drawn into and finally locked into the lifting device and which can be released without a person having to touch the object. It is also envisaged that the flexible material may be extensible if desired provided that it allows the object to be drawn into the lifting device.

It is envisaged that other embodiments of the invention will exhibit any number of and any combination of the features previously described.

Whilst we have described herein one specific embodiment of the invention it is to be understood that variations and modifications in this can be made without departing from the spirit and scope thereof.

I claim:

1. A lifting device, comprising:

an open fronted chassis having two front sides for allowing an object that is to be lifted to be able to enter said lifting device, said open fronted chassis being provided with a movable arm on each of said two front sides with said movable arms being connected together in close proximity to their respective outer extremities by an extensible member, said movable arms being cammed where each of said movable arms connects to said open fronted chassis in a housing, so that contact of said extensible member with the object to be lifted causes said movable arms to move around the object and to be automatically locked about the object by means of a spring loaded wedge drawn into each of said housings as said movable arms move around the object.

2. The lifting device according to claim 1, wherein said movable arms are adapted for supporting the object to be lifted.

3. The lifting device according to claim 2, wherein said movable arms terminate in load support members.

4. The lifting device according to claim 3, wherein said load support members have, at least in part, an arcuate shape.

5. The lifting device according to claim 1, wherein said open fronted chassis includes wheels for locomotion and further includes a handle for effecting said locomotion.

6. The lifting device according to claim 1, further comprising at least one rear load support member at the inside rear portion of said lifting device.

7. The lifting device according to claim 6, wherein at least a portion of said at least one rear load support member has an arcuate shape.

8. The lifting device according to claim 6, further comprising means for moving said at least one rear load support member into contact with the object to be lifted.

9. The lifting device according to claim 8, further comprising means for locking said at least one rear support member about the object to be lifted.

10. The lifting device according to claim 9, further comprising means for automatically releasing said movable arms and support members for said movable arms.

11. The lifting device according to claim 10, further comprising means for automatically returning said movable arms to an open position when the object to be lifted has been released.

12. The lifting device according to claim 9, further comprising means for automatically releasing said movable arms and support members for said movable arms, and said at least one rear support member.

13. The lifting device according to claim 12, further comprising means for automatically returning said movable arms to an open position when the object to be lifted has been released.

* * * * *